(12) United States Patent
Ueda et al.

(10) Patent No.: US 8,317,572 B2
(45) Date of Patent: Nov. 27, 2012

(54) METHOD FOR MANUFACTURING A GLASS SUBSTRATE FOR A MAGNETIC DISC

(75) Inventors: Masaaki Ueda, Shinjuku-ku (JP);
Ryuichi Kashima, Shinjuku-ku (JP);
Seiji Sakaguchi, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 322 days.

(21) Appl. No.: 12/682,873

(22) PCT Filed: Dec. 22, 2008

(86) PCT No.: PCT/JP2008/003880
§ 371 (c)(1),
(2), (4) Date: Jul. 15, 2010

(87) PCT Pub. No.: WO2009/081565
PCT Pub. Date: Jul. 2, 2009

(65) Prior Publication Data
US 2010/0285726 A1    Nov. 11, 2010

(30) Foreign Application Priority Data

Dec. 25, 2007  (JP) ................................. 2007-332492

(51) Int. Cl.
*B24B 1/00* (2006.01)
(52) U.S. Cl. ............................................ 451/44; 451/58
(58) Field of Classification Search .............. 451/41, 451/28, 43, 44, 51, 57, 58
See application file for complete search history.

(56) References Cited

U.S. PATENT DOCUMENTS

| 6,852,010 B2 * | 2/2005 | Takahashi et al. ............... 451/36 |
| 7,040,953 B2 * | 5/2006 | Matsuno et al. .................. 451/5 |
| 7,065,984 B2 * | 6/2006 | Kezuka et al. ..................... 65/61 |

FOREIGN PATENT DOCUMENTS

| JP | 05-071359 A | 3/1993 |
| JP | 11-033918 A | 2/1999 |
| JP | 11-070471 A | 3/1999 |
| JP | 11-267975 A | 10/1999 |
| JP | 2000-280171 A | 10/2000 |
| JP | 2001-328067 A | 11/2001 |
| JP | 2003-231044 A | 8/2003 |
| JP | 2003-236736 A | 8/2003 |

* cited by examiner

*Primary Examiner* — Dung Van Nguyen
(74) *Attorney, Agent, or Firm* — Sughrue Mion, PLLC (57) ABSTRACT

The invention aims at providing a method for manufacturing a glass substrate for a magnetic disc capable of eliminating undulations of an outer peripheral end face of a glass substrate in a short processing time, and obtaining high roundness. In a method for manufacturing a disc-like glass substrate for a magnetic disc, the method includes a forming step of pressing a rotating grindstone against an outer peripheral end face while the glass substrate is rotated, thereby forming an outer peripheral end. In the forming step, processing is performed using a first condition (S106) on which first undulations are formed and a second condition (S108) on which second undulations having a different wavelength from the first undulations are formed.

5 Claims, 4 Drawing Sheets

(a) First Condition (b) Second Condition

| Rotational Frequency A of Grindstone | 2412 |
|---|---|
| Rotational Frequency B1 of Main Shaft | 24 |
| Number of First Undulations C | 114 |

| Rotational Frequency A of Grindstone | 2412 |
|---|---|
| Rotational Frequency B2 of Main Shaft | 23.9 |
| Number of Second Undulations | Numerous (Smooth) |

(c) Calculation of Rotational Frequency B2 of Main Shaft on Second Condition (Rotational Frequency B1 of Glass Substrate)/(Rotational Frequency B2 of Glass Substrate) × Number of Undulations C=Rotational Frequency Ratio N2=2736/B2=Integer + 0.5  (Formula 5)

| Rotational Frequency B2 of Main Shaft | Rotational Frequency Ratio N2 on Second Condition | Rounding-Off to First Decimal Place |
|---|---|---|
| 23.6 | 115.9322 | 115.9 |
| 23.7 | 115.4430 | 115.4 |
| 23.8 | 114.9580 | 115.0 |
| 23.9 | 114.4770 | 114.5 |
| 24.0 | 114.0000 | 114.0 |
| 24.1 | 113.5270 | 113.5 |
| 24.2 | 113.0579 | 113.1 |
| 24.3 | 112.5926 | 112.6 |
| 24.4 | 112.1311 | 112.1 |

Comparison of Time Required for Obtaining Roughness Ra = about 0.2 μm

| Working Example | First Condition + Second Condition | 60 Seconds |
|---|---|---|
| Comparative Example | Only First Condition | 120 Seconds |

(b)

Comparison of Finishing in Same Processing Time

| | | Height of Undulations | Pitch of Undulations |
|---|---|---|---|
| Working Example | First Condition + Second Condition | 0.5 μm | 1.3 mm |
| Comparative Example | Only First Condition | 1 μm | 1.3 mm |

Fig. 6

METHOD FOR MANUFACTURING A GLASS SUBSTRATE FOR A MAGNETIC DISC

CROSS REFERENCE TO RELATED APPLICATIONS

This application is a National Stage of International Application No. PCT/JP2008/003880 filed Dec. 22, 2008, claiming priority based on Japanese Patent Application No. 2007-332492, filed Dec. 25, 2007, the contents of all of which are incorporated herein by reference in their reference.

BACKGROUND OF THE INVENTION

1. Field of the Invention

The present invention relates to a method for manufacturing a glass substrate for a magnetic disc to be used as a recording medium of a computer or the like.

2. Description of the Related Art

In recent years, an information recording technique, especially a magnetic recording technique is remarkably progressing with advancement of an information technique. As substrates for magnetic recording media such as HDDs (hard disk drives) that is one of magnetic recording media, a glass substrate which can be made small and thin and made high in recording density as compared to an aluminum substrate which is used conventionally and which is excellent regarding the flatness and substrate strength of the surface of the substrate is adopted.

Additionally, in order to achieve high recording density in a magnetic disc to be used for HDDs or the like, a vertical magnetic recording type magnetic disc (vertical magnetic recording disk) has recently been suggested. With such an increase in information recording density, both linear recording density (BPI: Bit Per Inch) in a circumferential direction and track recording density (TPI: Track Per Inch) in a radial direction are being increased steadily. Moreover, a technique of narrowing the gap (magnetic spacing) between a magnetic layer of a magnetic disc and a recording/reproducing element of a magnetic head, thereby improving an S/N ratio, has also been studied. The floating height of a magnetic head which is desired in recent years is 8 nm to about 6 nm.

Moreover, high reading speed is required with the improvement in recording density as described above. In order to cope with this requirement, the rotational frequency at the time of reading tends to increase, and the rotational frequency of 7200 rpm or more is required in recent years.

In the above situations, as for chamfering of a glass substrate, a configuration in which end faces of the glass substrate are ground using a pulley-like rotating grindstone is also described conventionally in Patent Document 1 (Japanese Patent Laid-Open Publication No. 11-267975). In Patent Document 1, the entry angle of a grindstone with respect to the surface of the glass substrate is specified and two or more fine cooling water discharge holes are arranged in a grinding surface. Thereby, progress of chipping or cracking of end faces of the glass substrate is suppressed, so that the lifespan of a grindstone can be prolonged.

The reason why the chamfering is performed on the glass substrate is because generation of chips or foreign matters is prevented by making ends of the substrates smooth. If the surface state of an end face of the glass substrate is not smooth, there is a probability that resin or particles which are generated at this end face produce friction with a wall surface of a case made of resin, or other particles which are caught by an inner peripheral end face and an outer peripheral end face of the glass substrate may adhere to the main surfaces of the substrate in future. If a magnetic layer is formed while the particles have adhered to the main surfaces of the glass substrate, the particles cause film defects, or convex portions are formed in the surface of a magnetic disc. Thus, proper glide height is not obtained, and a thermal asperity failure is caused.

Additionally, as the ends are chipped, there is a probability that the strength of the glass substrate may deteriorate or the precision of concentricity may deteriorate. That is, the grinding of the ends of the substrate has been a big issue in order to reduce the rate of occurrence of chipping, improve production efficiency, and reduce manufacturing cost.

Meanwhile, polishing of main surfaces of a glass substrate is performed by providing a plurality of small holes in a carrier in which a sun gear and an internal gear meshes with each other so as to perform a planetary gear motion, and pressing polishing pads from above and below in a state where the glass substrate is mounted on each of the small holes (for example, Patent Document 2). Accordingly, two or more glass substrates can be polished at a time, and can be polished uniformly so that neither polishing traces nor variations may be generated in the substrates.

[Patent Document 1] Japanese Patent Application Laid-Open No. 11-267975
[Patent Document 2] Japanese Patent Application Laid-Open No. 2000-280171

Figure 6:
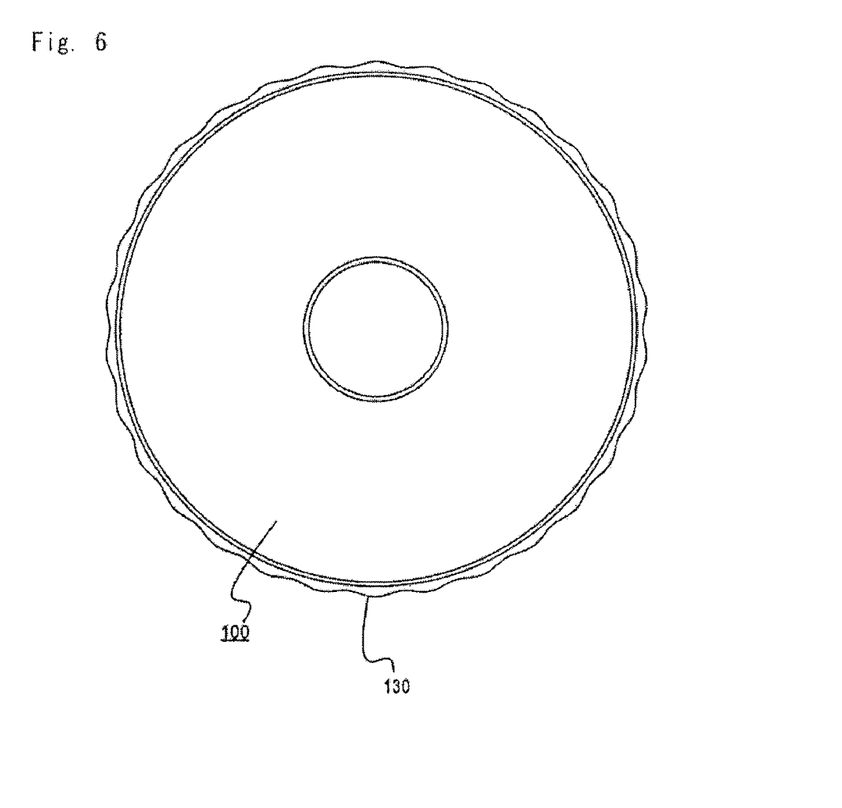
FIG. 6 is a view illustrating undulations formed at an outer peripheral end face of a conventional glass substrate.

However, when end faces of a glass substrate is ground using a pulley-like rotating grindstone as described in Patent Document 1, irregularities (undulations) having a fixed interval of wavelength are formed at an outer peripheral end face. FIG. 6 is a view illustrating undulations formed at an outer peripheral end face of a conventional glass substrate. In order to facilitate understanding, the undulations are expressed in an emphasized manner in this drawing. As shown in this drawing, periodic undulations are formed at an outer peripheral end face 130 of a glass substrate 100. The undulations of this outer peripheral end face could be found by the visual inspection. However, since a magnetic head does not run on the outer peripheral end face and the outer peripheral end face was also mirror-polished, this was not conventionally acknowledged as a problem.

However, after the outer peripheral end face is polished, main surfaces are polished as described in Patent Document 2. At this time, since a glass substrate is mounted on each small hole, its outer peripheral end face rubs against a carrier. For this reason, if undulations are at the outer peripheral end face, more apexes of the undulations rub against an inner peripheral surface of the small hole of the carrier. Therefore, spotted scratches (abrasion) will be generated at the apexes.

Such damage causes generation of particles, and consequently, if the generated particles are attracted to the main surfaces, they cause convex defects after a magnetic disc is obtained, and cause a thermal asperity failure or a head crash. Additionally, metal ion included in the glass substrate is apt to be eluted from such damaged spots, and this causes corrosion which precipitates on the surface of the magnetic disc.

These problems are big problems with a further increase in capacity and a further increase in recording density in future. Additionally, it is known that, if grinding is performed with sufficient time, the undulations can be eliminated. However, since it is necessary to produce glass substrates on a large scale inexpensively, it is difficult to secure enough processing time to eliminate the undulations.

SUMMARY OF THE INVENTION

Thus, an object of the invention is to provide a method for manufacturing a glass substrate for a magnetic disc capable of eliminating undulations of an outer peripheral end face of a glass substrate in a short processing time, and obtaining high roundness.

In order to solve the above problems, when the inventors have keenly studied the problems, attention was paid to the fact that undulations of an outer peripheral end face are generated due to the resonance of the natural frequency of an apparatus, the vibration at the rotation of the substrate, the rotational frequency of a grindstone (cutting edge), and vibrations generated by other subsidiary members. The inventors also have found that the outer peripheral end face can be made smooth by intentionally forming undulations different from formed undulations, and finally offsetting the formed undulations with undulations which have a phase opposite to the phase of the formed undulations, and thus have completed the invention.

That is, a representative configuration of the invention is a method for manufacturing a disc-like glass substrate for a magnetic disc, the method comprising a forming step of pressing a rotating grindstone against an outer peripheral end face while the glass substrate is rotated, thereby forming an outer peripheral end. In the forming step, processing is performed using a first condition on which first undulations are formed and a second condition on which second undulations having a different wavelength from the first undulations are formed.

According to the above configuration, the first undulations formed at the outer peripheral end face of the glass substrate can be offset by the second undulations. Accordingly, the undulations of the outer peripheral end face of the glass substrate can be eliminated in short processing time, and high roundness can be obtained. Accordingly, generation of particles can be prevented, and generation of corrosion from the outer peripheral end face can be suppressed in a magnetic disc.

The first condition or the second condition may be the rotational frequency of the glass substrate or a rotating grindstone. That is, although conditions of an end face grinding step are various, the first condition and the second condition on which the first undulations and the second undulations are produced can be set by adjusting the rotational frequency of the glass substrate or rotating grindstone.

The first condition or the second condition may be the rotational frequency of the glass substrate or rotating grindstone whose rotation is slower. If rotation is fast, gear ratio is large, and fine adjustment is difficult. Therefore, the second undulations which offset the first undulations can be formed more exactly by controlling the rotational frequency having slower rotation.

In the forming step, processing may be performed using the first condition, and processing may be performed after a change to the second condition with the rotating grindstone pressed against the glass substrate. Processing time can be shortened by continuously performing processing in this way. Additionally, when the first condition and the second condition are rotational frequencies, particularly condition changes are continuously enabled.

In the forming step, the rotational frequency B2 (rpm) of the glass substrate on the second condition may be a rotational frequency at which the value of a first decimal place becomes 5 when the rotational frequency of the rotating grindstone is defined as A (rpm), the rotational frequency of the glass substrate on the first condition is defined as B1 (rpm), the number of undulations is defined as C, and an operation result of (B1/B2)×C is rounded off to a first decimal place. By setting the second condition in this way, the first undulations which are formed according to the first condition can be out of phase with the second undulations by half, and the first undulations can be surely offset, so that a smooth outer peripheral end face can be obtained.

According to the invention, it is possible to provide a method for manufacturing a glass substrate for a magnetic disc capable of eliminating undulations of an outer peripheral end face of a glass substrate in a short processing time, and obtaining high roundness. Accordingly, generation of particles can be prevented in a magnetic disc, and generation of corrosion from the outer peripheral end face can be suppressed in the magnetic disc.

REFERENCE NUMERALS

100: GLASS SUBSTRATE
102: INNER HOLE
120: INNER PERIPHERAL END FACE
120a: CHAMFERED PORTION
130: OUTER PERIPHERAL END FACE
130a: CHAMFERED PORTION
200: END FACE GRINDING APPARATUS
210: OUTSIDE GRINDSTONE
212: SHAFT
214: MOTOR
220: INSIDE GRINDSTONE
222: SHAFT
224: MOTOR
230: ROTATION CONTROLLER
310: POLISHING PAD
330: SUN GEAR
340: INTERNAL GEAR
350: UPPER SURFACE PLATE
360: LOWER SURFACE PLATE
370: CARRIER

DESCRIPTION OF THE PREFERRED EMBODIMENTS

Hereinafter, preferred embodiments of the invention will be described in detail with reference to the accompanying drawings. The dimensions, materials, other concrete numeric values, etc. shown in this embodiment are just illustrative for making the invention easily understood, and do not limit the invention except for a case where they are particularly noted. In addition, in the present specification and drawings, duplicate description is omitted by giving the same reference numerals to elements having substantially the same functions and configurations, and illustration of elements which are not directly related to the invention is omitted.

Figure 1:
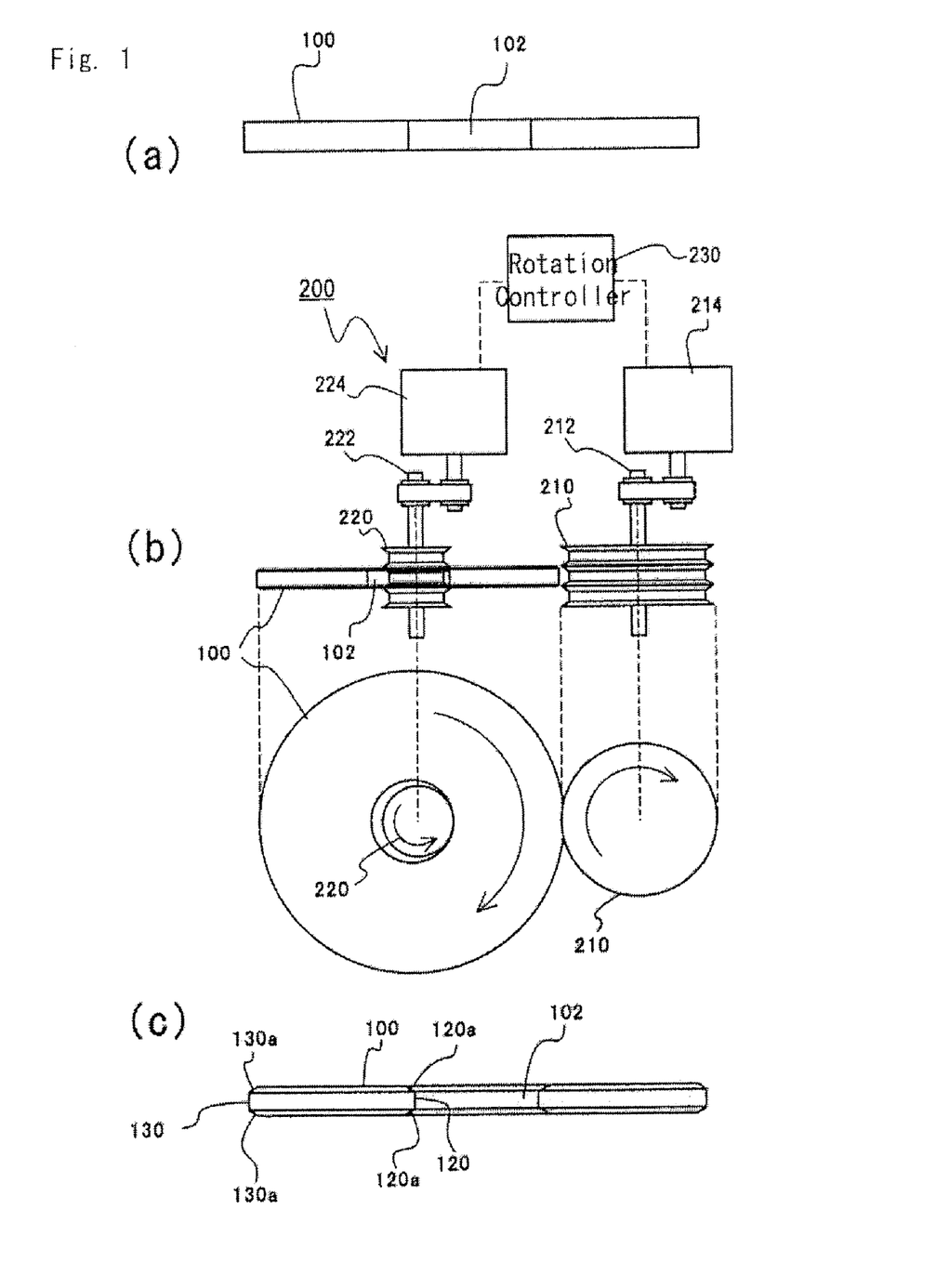
FIG. 1 is a view illustrating a forming step.

FIG. 1 is a view illustrating a forming step which performs grinding and chamfering of end faces (an outer peripheral end face and an inner peripheral end face) of a glass substrate. FIG. 1(a) is a sectional view of the glass substrate before the forming step is performed. As shown in this drawing, the forming step is performed on an annular glass substrate 100 in which an inner hole 102 is formed at the center of a disc-like glass substrate.

FIG. 1(b) is a view schematically illustrating an end face grinding apparatus 200. In the end face grinding apparatus 200 shown in this drawing, an outside grindstone 210 as an example of grinding means is arranged outside the glass substrate 100, and an inside grindstone 220 as an example of grinding means is also inserted through the inner hole 102. Shafts 212 and 222 of the outside grindstone 210 and the inside grindstone 220 are movable, and are pressed so as to pinch the glass substrate 100 in a radial direction by pressing means (not shown). The outside grindstone 210 and the inside grindstone 220 are pulley-like rotating grindstones, and include grinding surfaces (a central flat portion and an inclined portion) at their outer peripheral surfaces. The glass substrate 100, the outside grindstone 210, and the inside grindstone 220 are rotationally driven by motors 214 and 224 as examples of driving means, respectively, and their rotational directions are set so as to be a direction opposite to the rotational direction of the glass substrate at respective contact points. The rotational frequency of the motors 214 and 224 is controlled by a rotation controller 230. In addition, in FIG. 1, a supporting mechanism and a rotational driving mechanism of the glass substrate 100 are omitted.

As shown in FIG. 1(c), by grinding the inner peripheral end face 120 and the outer peripheral end face 130 of the glass substrate 100, chamfered portions 120a and 130a are formed in these end faces, respectively.

The forming step using the end face grinding apparatus 200 of the above configuration will be described. In the forming step, grinding of the outer peripheral end face 130 and the inner peripheral end face 120 is performed by pressing and rotating the outside grindstone 210 and the inside grindstone 220 against the outer peripheral end face 130 and the inner peripheral end face 120, respectively, while rotating a glass substrate. At this time, it is desirable that grinding be performed while cooling liquid (coolant) is applied.

Figure 2:
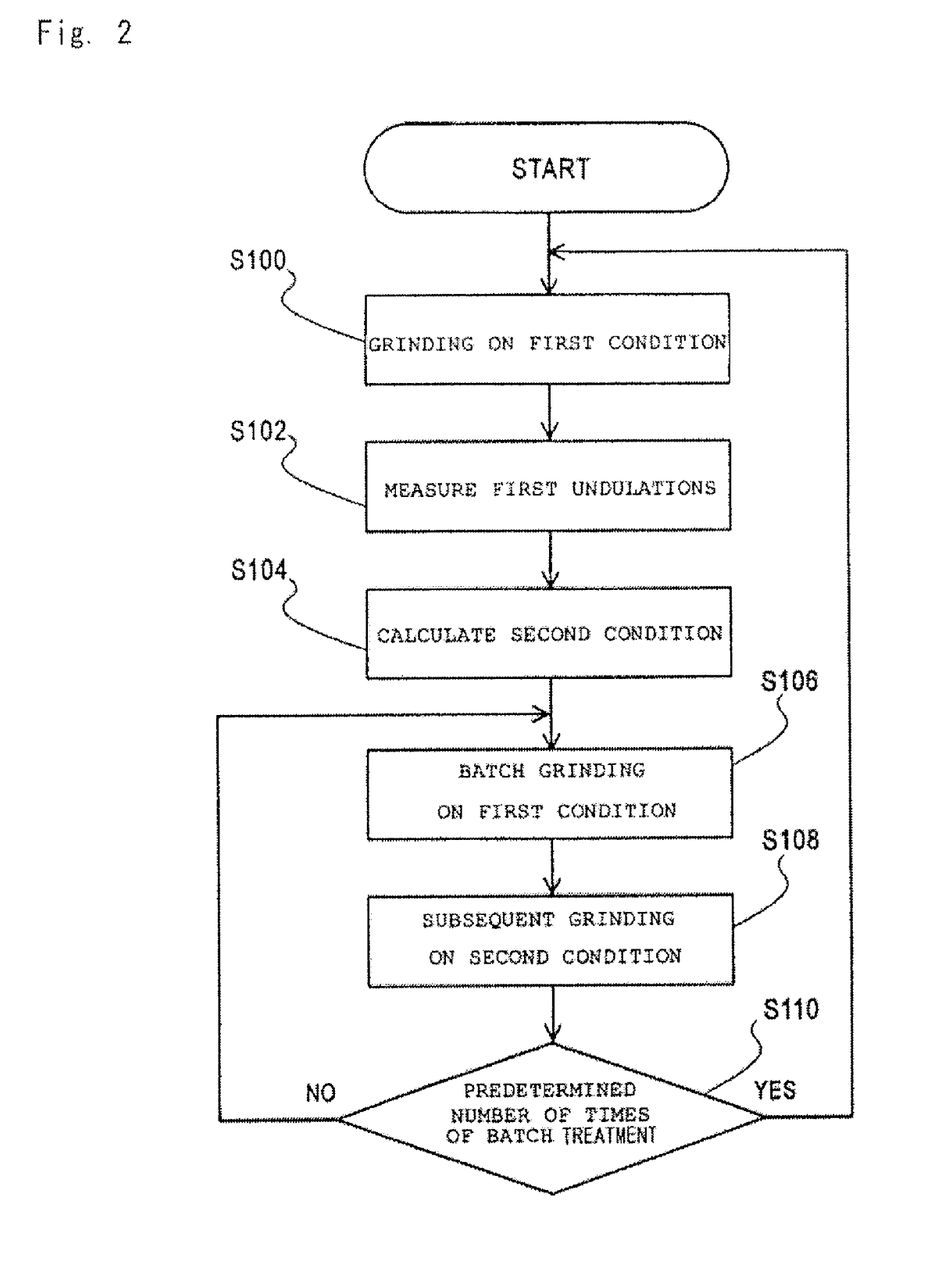
FIG. 2 is a flow chart illustrating the forming step.

FIG. 2 is a flow chart illustrating the forming step. In the forming step, first, grinding is performed using predetermined conditions (S100). Here, the predetermined conditions are conditions for performing main processing for forming an outer peripheral end face, and include the rotational frequency of the outside grindstone 210 and the inside grindstone 220, the roughness of the outside grindstone 210, and the inside grindstone 220, the rotational frequency of the glass substrate 100, pressure, etc. Here, although the outer peripheral end face is ground in a circular shape, first undulations are caused. In this embodiment, the undulations formed at the outer peripheral end face 130 at this time are defined as the first undulations, and particularly the rotational frequency of the glass substrate 100 among predetermined conditions is called a first condition.

Next, the first undulations formed at the outer peripheral end face 130 are measured (S102). The undulations of the outer peripheral end face 130 can be measured using a contact type fine contour shape measuring instrument, for example, using needle. Additionally, the wavelength or amplitude of the undulations, the number of apexes, etc. may be measured by visual inspection.

Then, a second condition under which second undulations with a wavelength different from the first undulations are formed is calculated (S104). The second undulations just have to be different in wavelength from the first undulations. This enables the first undulations formed at the outer peripheral end face of the glass substrate to be offset by the second undulations. It is to be noted herein that a case where the wavelength of the second undulations is an integral multiple of the first undulations is excluded. This is because peaks of the undulations overlap each other, and thus, such offset cannot be made.

In this embodiment, the second condition is the rotational frequency of the glass substrate, similarly to the first condition. That is, although conditions of an end face grinding step are various, the first condition and the second condition on which the wavelengths of the first undulations and the second undulations are made different from each other can be set by changing the rotational frequency of the glass substrate.

In addition, the first condition and the second condition are not the rotational frequency of the glass substrate but may be the rotational frequency of a rotating grindstone. However, if rotation is fast, gear ratio is large, and fine adjustment is difficult. Therefore, the second undulations which offset the first undulations more exactly can be formed by controlling the rotational frequency having slower rotation. In this embodiment, as will be described later, the glass substrate has a lower rotational frequency than the rotating grindstone. Therefore, the rotational frequency of the glass substrate is used as a condition.

Additionally, in order to surely form the second undulations which will offset the first undulations, the second condition can be obtained from the first condition and the first actual undulations measured in S102, in the following manner.

When the rotational frequency of the rotating grindstone is defined as A (rpm), the rotational frequency of the glass substrate on the first condition is defined as B1 (rpm), and the number of the first undulations is defined as C, the rotational frequency B2 (rpm) of the glass substrate on the second condition is obtained. Here, since the number of undulations C is an actual measurement value, it is a value whose reliability is high, since the rotational frequency B1 of the glass substrate is at a low speed, it is a value whose reliability is high, and since the rotational frequency A of the rotating grindstone is at a high speed, it is a value whose reliability is low.

Here, like the following formula, a value obtained by dividing the rotational frequency of the grindstone by the rotational frequency of the substrate is defined as a rotational frequency ratio N.

$$(\text{Rotational Frequency } A \text{ of Grindstone})/(\text{Rotational Frequency } B1 \text{ of Glass Substrate}) = \text{Rotational Frequency Ratio } N = (i+1)/j \quad \text{[Formula 1]}$$

(i: integer, and 1/j=broken number)

When 1/j=0, deviation of one pitch occurs in one rotation of the grindstone and i ridges are formed on the surface of the glass substrate. When 1/j=0.5, grinding surface roughness and the length of a pitch become half and the number of ridges become twice (2i+1) the ratio N. Therefore, a high circularity can be obtained.

Thus, first, in setting the first condition, the first condition is set so that a first decimal place of a rotational frequency ratio N1 on the first condition may become 5. Although a high circularity can be theoretically obtained in this state, various hindrance factors, such as runout of a shaft, vibration, precision, and wear, are involved actually. Therefore, balance collapses, and coarse undulations are formed in an outer peripheral end face. The relationship at this time can be expressed like the following formula. Since the rotational frequency B1 of the glass substrate and the number of undulations C are high-precision values in the following formula as described above, it is assumed that it is correct.

(Actual Rotational Frequency $A'$ of Grindstone)/(Rotational Frequency $B1$ of Glass Substrate)=Number of Undulations $C$     [Formula 2]

Next, in order to form the second undulations which offset the above undulations, the rotational frequency $B2$ of the glass substrate on the second condition is set. When the wavelength of undulations is out of phase by half, the first undulations can be offset by the second undulations. Therefore, the rotational frequency $B2$ of the substrate on the second condition is obtained so that a first decimal place of a rotational frequency ratio $N2$ on the second condition may be set to 5.

(Actual Rotational Frequency $A'$ of Grindstone)/(Rotational Frequency $B2$ of Glass Substrate)=Rotational Frequency Ratio $N2$=Integer+0.5     [Formula 3]

(where $B2$ and $N2$ are values on the second condition)

If "Actual Rotational Frequency $A'$ of Grindstone" is eliminated from Formula 3 by using Formula 2, Formula 3 can be expressed like the following formula.

(Rotational Frequency $B1$ of Glass Substrate)/(Rotational Frequency $B2$ of Glass Substrate)×Number of Undulations $C$=Rotational Frequency Ratio $N2$=Integer+0.5     [Formula 4]

That is, the rotational frequency $B2$ of the substrate is obtained so that the value of a first decimal place when an operation result (rotational frequency ratio $N2$ on the second condition) of $(B1/B2) \times C$ is rounded off to a first decimal place may be set to 5. By setting the second condition in this way, the first undulations which are formed according to the first condition can be out of phase with the second undulations by half, and the first undulations can be surely offset, so that a smooth outer peripheral end face can be obtained.

After the second condition is calculated as described above, a forming step related to production is performed (S104). Batch grinding is first performed on the first condition (S106), and processing is performed by changing the grinding condition to the second condition with the rotating grindstone pressed against the glass substrate (with the glass substrate set in the apparatus) (S108). Although the polishing according to the first condition allows a margin, the polishing according to the second condition is performed only for the purpose of offsetting undulations by so-called zero cutting where the grindstone is not made to advance. Accordingly, the polishing according to the second condition may be performed in a short time, for example, in about (about 4 rotations) 10 seconds. Processing time can be shortened by continuously performing processing in this way. Additionally, since the first condition and the second condition are rotational frequencies, particularly condition changes are continuously enabled.

However, the outside grindstone 210 and the inside grindstone 220 are worn out if the number of times of batch treatment is accumulated. Additionally, the outside grindstone 210 and the inside grindstone 220 have a plurality of grinding surfaces, and if the grindstones wear out, processing is performed by a new grinding surface after a stage is switched. If situations (actual rotational frequency D, etc.) change in this way, it will become impossible thus, to apply the second condition obtained by S104. Then, whether or not a predetermined number of times of batch treatment have been performed is determined (S110). If the batch treatment is not performed, the next batch treatment is performed (S106), and if the batch treatment has been performed, the processing returns to S100 where calculation of the second condition is resumed. Thereby, a second optimal condition which is always based on actual conditions can be used.

According to the above configuration, the undulations of the outer peripheral end face of the glass substrate can be eliminated in short processing time, without waiting for processing time enough to eliminate undulations according to one grinding condition. Accordingly, mass production can be performed, and production cost can be reduced.

Figure 3:
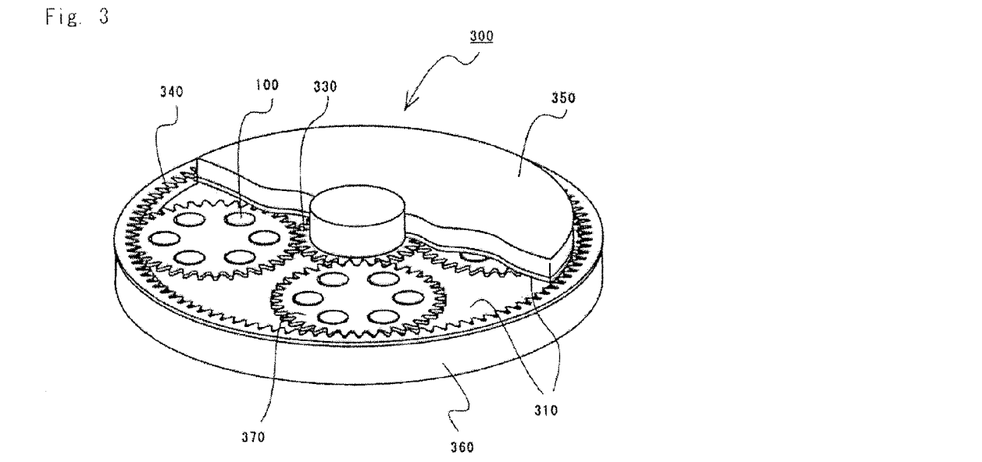
FIG. 3 is an explanatory view of a double side polishing apparatus for polishing main surfaces of a glass substrate.

FIG. 3 is an explanatory view of a double side polishing apparatus for polishing main surfaces of a glass substrate. The double side polishing apparatus 300 shown in FIG. 3 has a carrier mounting portion having a sun gear 330 and an internal gear (hereinafter referred to as an "internal gear 340") which are rotated in a predetermined rotation ratio, respectively, and an upper surface plate 350 and a lower surface plate 360 which are rotationally driven in directions opposite to each other with this carrier mounting portion therebetween. Polishing pads 310 are respectively stuck on the surfaces of the upper surface plate 350 and the lower surface plate 360 which face the glass substrate 100.

A carrier 370 which has a gear on its outer periphery meshes with the sun gear 330 and the internal gear 340, and the sun gear 330 and the internal gear 340 rotate relative to each other, thereby performing a planetary gear motion. The carrier 370 is provided with a plurality of small holes, and the glass substrate 100 is held by each of the small holes.

The lower surface plate 360 is fixedly installed and the upper surface plate 350 is configured so as to be movable vertically, so that the glass substrate 100 held by the carrier 370 can be pinched and pressed by the polishing pads 310. By performing the planetary gear motion of the carrier 370 while polishing liquid (slurry) including loose grains is supplied, the front and back main surfaces of the glass substrate 100 are polished.

A main surface polishing step using the above apparatus is performed after the outer peripheral end face is mirror-polished, as will be described later. At this time, the glass substrate 100 is mounted on each small hole of the carrier 370, and is polished. However, in the glass substrate 100 according to this embodiment, undulations of the outer peripheral end face 130 can be eliminated and the end face can be made smooth. Therefore, spotted scratches caused by sliding friction with the carrier are not generated at apexes of the undulations. Accordingly, generation of particles generated from the outer peripheral end face can be prevented effectively, and even after the substrate has been made into a magnetic disc, generation of corrosion from the outer peripheral end face can be suppressed.

WORKING EXAMPLE

Hereinafter, an embodiment will be described below about a method for manufacturing a glass substrate for a magnetic disc to which the invention is applied.

(1) Shaping Step And First Lapping Step

Although materials for a glass substrate in this embodiment include soda lime glass, aluminosilicate glass, borosilicate glass, crystallized glass, etc., aluminosilicate glass is especially suitable. Since smoothness and high rigidity are obtained in the aluminosilicate glass, magnetic spacing, especially the floating height of a magnetic head can be reduced more stably. Additionally, in the aluminosilicate glass, high rigidity and strength can be obtained by chemical strengthening.

First, melted aluminosilicate glass was molded into a disc shape by direct pressing using an upper mold, a lower mold, and a barrel mold, and amorphous plate-like glass was obtained. In addition, glass for chemical strengthening was used as the aluminosilicate glass. A disc-like glass substrate for a magnetic disc may be obtained by performing cutting out by a grinding grindstone from sheet glass formed by a down-draw method or a floating method in addition to the direct pressing. In addition, as this aluminosilicate glass, chemically strengthened glass containing $SiO_2$: 58 to 75% by weight, $Al_2O_3$: 5 to 23% by weight, $Li_2O$: 3 to 10% by weight, and $Na_2O$: 4 to 13% by weight as main components was used.

Next, both the main surfaces of this plate-like glass were lapped, and a disc-like glass preform was obtained. This lapping was performed using alumina-based loose grains by a double side lapping apparatus using a planetary gear mechanism. Specifically, lapping was performed by pressing a lap surface plate against both surfaces of a plate-like glass from above and below, supplying grinding liquid including loose grains onto the main surface of the plate-like glass, and moving them relative to each other. A glass preform having flat main surfaces was obtained by this lapping.

(2) Cutting-Out Step (Coring And Forming)

Next, the glass preform was cut using a diamond cutter and a disc-like glass substrate was cut out from this glass preform. Next, an inner hole was formed at a central portion of this glass substrate by using a cylindrical diamond drill, and an annular glass substrate 100 was obtained (coring).

Next, grinding and chamfering of end faces (an outer peripheral end face and an inner peripheral end face) of the glass substrate was performed by performing the above-mentioned forming step.

Figure 4:
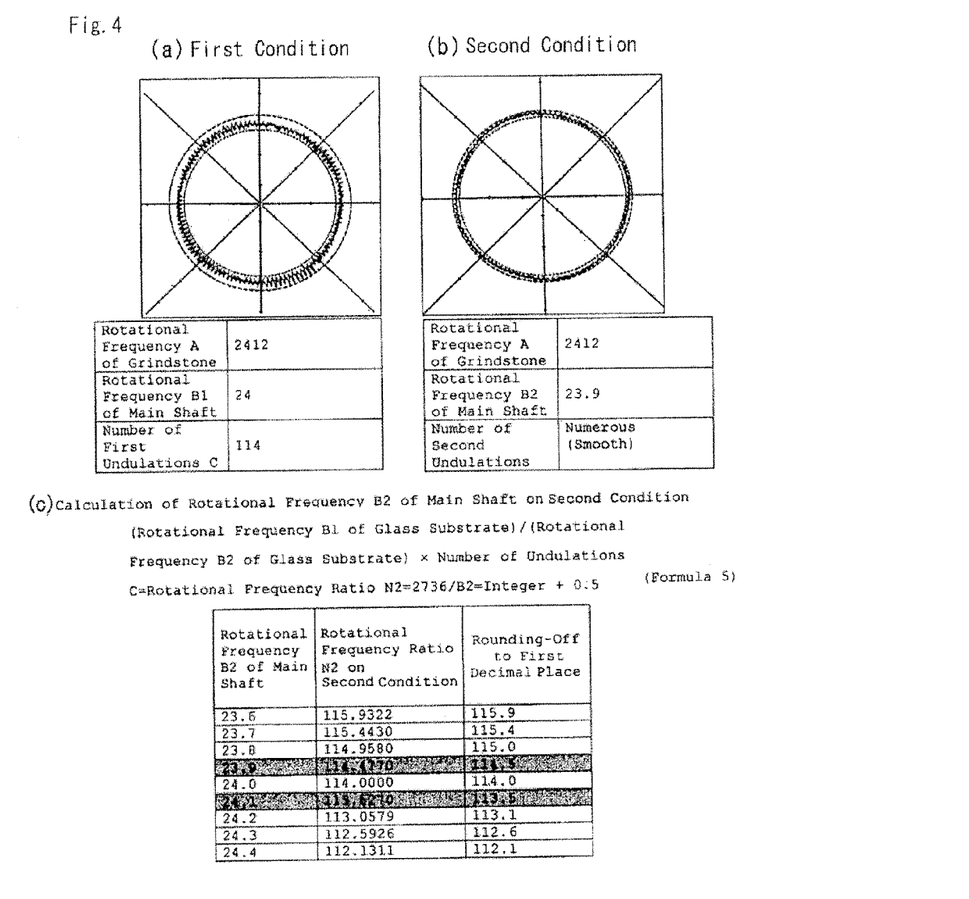
FIG. 4 is a view illustrating grinding conditions according to a working example, and undulations of an outer peripheral end face.

FIG. 4 is a view illustrating grinding conditions according to the working example, and undulations of an outer peripheral end face. The first condition is first set at the grinding the outer peripheral end face. In the first condition, the first condition is set so that a first decimal place of the rotational frequency ratio N1 may become 5. In this working example, the rotational frequency of the grindstone is set to A=2,412, and the rotational frequency of the substrate on the first condition is set to B1=24. At this time, the rotational frequency ratios N are 2,412/24=100.5. Although a high circularity can be theoretically obtained in this state, various hindrance factors, such as runout of a shaft, vibration, precision, and wear, are involved actually. Therefore, balance collapses, and undulations are formed in the outer peripheral end face. In this working example, the number of undulations measured was C=114. Then in order to form the second undulations which offset the first undulations, values are substituted into the above Formula 4, and the rotational frequency B2 of the glass substrate on the second condition is set.

(Rotational Frequency $B1$ of Glass Substrate)/(Rotational Frequency $B2$ of Glass Substrate)×Number of Undulations $C$=Rotational Frequency Ratio $N2=2736/B2$=Integer+0.5   Formula [5]

If a value where the first decimal place of the rotational frequency ratio N2 obtained by 2736/B2 becomes 5 is calculated, the rotational frequency ratio N2=114.5 (114.47) can be calculated when B2 is 23.9 (rpm), and the rotational frequency ratio N2=113.5 (113.52) can be calculated when B2 is 24.1 (rpm). Accordingly, the rotational frequency B2 of the substrate as the second condition can be set to 23.9, 24.1, etc. In addition, the difference between B1 and B2 may be one or more, and if a broken number (the first decimal place) is 5, half out-of-phase is enabled.

By using the above first condition and second condition, the first undulations could be offset by the second undulations, and the undulations of the outer peripheral end face of the glass substrate could be eliminated in short processing time, and the glass substrate could be processed smoothly.

Figure 5:
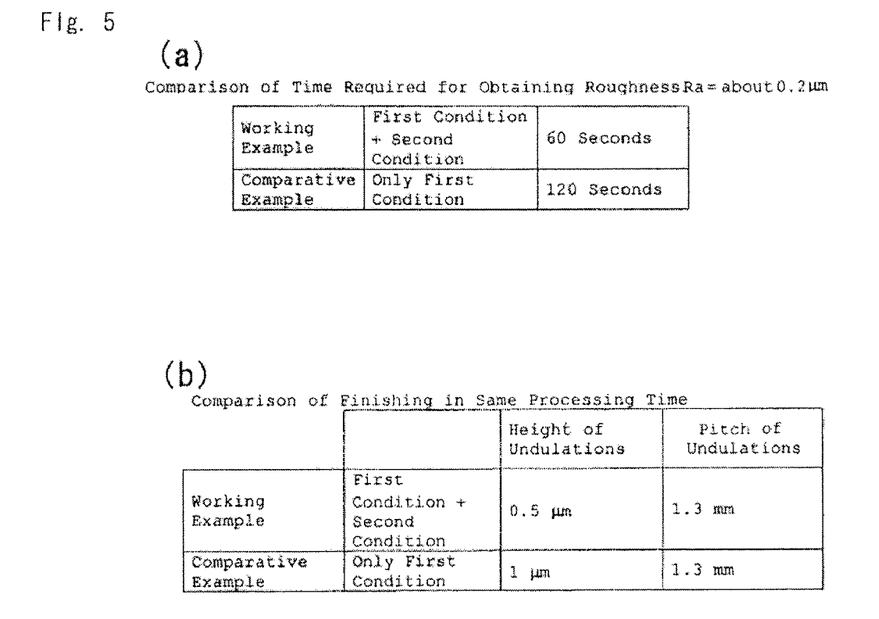
FIG. 5 is a view illustrating the contrast between the working example and a comparative example.

FIG. 5 is a view illustrating the contrast between the working example and a comparative example. As described above, even if grinding has been made only on the first condition, finishing with desired surface roughness can be done if long processing time is taken. However, as shown in FIG. 5(a), in order to perform finishing with nearly equal roughness (for example, Ra=about 200 nm=about 0.2 μm), about 120 seconds were required only on the first condition. In contrast, when grinding was made on the second condition after the first condition like the working example, the grinding can be achieved in about 60 seconds. It can be seen from this that the undulations of the outer peripheral end face can be eliminated early while processing time can be shortened.

Additionally, when treatment is performed in the same processing time, a difference is caused in the undulations of the outer peripheral end face. Due to this, a difference is caused in the generation of particles or corrosion. That is, as shown in FIG. 5(b), in the comparative example, the undulation height was about 1 μm and the pitch was about 1.3 mm. On the other hand, it can be seen in the working example that the undulation height becomes 0.5 μm, the pitch becomes about 1.3 mm, and the undulation height is suppressed very low.

(3) Second Lapping Step

Next, second lapping was performed on both the main surfaces of the obtained glass substrate, similarly to the first lapping step. By performing this second lapping step, a fine concavo-convex shape formed in the main surfaces in the cutting-out step or end face polishing step that is a previous step can be removed in advance, and a subsequent polishing step on the main surfaces can be completed in a short time.

(4) End Face Polishing Step

Next, mirror polishing was performed on the outer peripheral end face of the glass substrate by a brush polishing method. At this time, slurry (loose grains) including cerium oxide abrasive grains was used as polishing grains.

Then, the glass substrate subjected to the end face polishing step was water-cleaned. The end faces of the glass substrate were processed in a specular surface state where generation of precipitation of sodium or potassium can be prevented by this end face polishing step.

Especially the inner peripheral end face was in good condition without deteriorating the tolerance or roundness of the inner hole, even if a number of, e.g., about 200 to 300 sheets of glass substrates were stacked and polished.

(5) Main Surface Polishing Step

As a main surface polishing step, first, a first polishing step was performed. This polishing step mainly aims at removing any scratching or distortion of the main surfaces remained in the aforementioned lapping step. In this first polishing step, the main surfaces were polished using a rigid resin polisher by a double side polishing apparatus having a planetary gear mechanism. Cerium oxide abrasive grains were used as an abrasive agent.

The glass substrate 100 subjected to this first polishing step was sequentially dipped in respective cleaning baths of neutral detergent, pure water, and IPA (isopropyl alcohol), and was cleaned.

Next, as the main surface polishing step, a second polishing step was performed. This second polishing step aims at finishing the main surfaces into mirror surfaces. In this second polishing step, the main surfaces were mirror-polished using a soft resin foam polisher by a double side polishing apparatus having a planetary gear mechanism. Cerium oxide abrasive grains finer than the cerium oxide abrasive grains used in the first polishing step were used as an abrasive agent.

The glass substrate 100 subjected to this second polishing step was sequentially dipped in respective cleaning baths of neutral detergent, pure water, and IPA (isopropyl alcohol), and was cleaned. In addition, supersonic waves were applied to each cleaning bath.

(6) Chemical Strengthening Step

Next, chemical strengthening was performed on the glass substrate 100 subjected to the aforementioned lapping step and polishing step. The chemical strengthening was performed by preparing a chemical strengthening solution obtained by mixing potassium nitrate (60%) and sodium nitrate (40%), heating this chemical strengthening solution to 400° C., preheating the cleaned glass substrate 100 to 300° C., and immersing the glass substrate in the chemical strengthening solution for about 3 hours. In order to chemically strengthen the whole surface of the glass substrate 100 in this immersion, the immersion was performed in a state where a plurality of glass substrates 100 were housed by a holder so as to be held at their end faces.

By performing the immersion treatment in the chemical strengthening solution in this way, lithium ions and sodium ions of a surface layer of the glass substrate 100 are respectively replaced by sodium ions and potassium ions in the chemical strengthening solution, and the glass substrates are strengthened. The thickness of a compressive stress layer formed in the surface layer of each of the glass substrates was about 100 μm to 200 μm.

The glass substrate 100 subjected to the chemical strengthening treatment was immersed in a water bath of 20° C., was quenched, and was maintained for about 10 minutes. Then, the cleaning was performed by immersing the glass substrate 100 subjected to the quenching in a concentrated sulfuric acid heated to about 40° C. Moreover, the glass substrate subjected to the sulfuric acid cleaning was sequentially dipped in respective cleaning baths of pure water and IPA (isopropyl alcohol), and was cleaned. In addition, supersonic waves were applied to each cleaning bath.

As described above, a flat and smooth glass substrate 100 for a high-rigidity magnetic disc was obtained by performing the first lapping step, the cutting out step, the end face polishing step, the second lapping step, the first and second polishing steps, and the chemical strengthening step. Additionally, the glass substrate 100 whose outer peripheral end face also is smooth and has high roundness can be obtained.

(7) Magnetic Disc Manufacturing Step

A vertical magnetic recording disk was manufactured by sequentially forming an adhesion layer made of a Cr alloy, a soft magnetic layer made of a CoTaZr-based alloy, a foundation layer made of Ru, a vertical magnetic recording layer made of a CoCrPt-based alloy, a protective layer made of hydrogenation carbons, and a lubrication layer made of perfluoropolyether on both surfaces of the glass substrate 100 obtained through the above-described steps. In addition, although this configuration is an example of the configuration of a vertical magnetic disc, a magnetic layer, etc. may be configured as an in-plane magnetic disc.

The obtained magnetic disc also had an outer peripheral end face which is smooth and high roundness. Accordingly, it was possible to obtain a magnetic disc in which film defects or convex defects caused by particles were very few, and any corrosion caused from the outer peripheral end face was also suppressed.

The invention can be utilized as a method for manufacturing a glass substrate for a magnetic disc.

What is claimed is:

1. A method for manufacturing a disc-like glass substrate for a magnetic disc,
   the method comprising a forming step of pressing a rotating grindstone against an outer peripheral end face while the glass substrate is rotated, thereby forming an outer peripheral end,
   wherein, in the forming step, processing is performed using a first condition on which first undulations are formed and a second condition on which second undulations having a different wavelength from the first undulations are formed.

2. The method for manufacturing a glass substrate for a magnetic disc according to claim 1,
   wherein the first condition or the second condition is the rotational frequency of the glass substrate or a rotating grindstone.

3. The method for manufacturing a glass substrate for a magnetic disc according to claim 2,
   wherein the first condition or the second condition is the rotational frequency of the glass substrate or rotating grindstone whose rotation is slower.

4. The method for manufacturing a glass substrate for a magnetic disc according to claim 2,
   wherein, in the forming step, the rotational frequency B2 (rpm) of the glass substrate on the second condition is a rotational frequency at which the value of a first decimal place becomes 5 when the rotational frequency of the rotating grindstone is defined as A (rpm), the rotational frequency of the glass substrate on the first condition is defined as B1 (rpm), the number of first undulations is defined as C, and an operation result of (B1/B2)×C is rounded off to a first decimal place.

5. The method for manufacturing a glass substrate for a magnetic disc according to claim 1,
   wherein, in the forming step, processing is performed using the first condition, and processing is performed after a change to the second condition with the rotating grindstone pressed against the glass substrate.

* * * * *